United States Patent
Oka et al.

(10) Patent No.: US 10,815,553 B2
(45) Date of Patent: Oct. 27, 2020

(54) GALVANNEALED STEEL SHEET AND PRODUCTION METHOD THEREOF

(71) Applicant: NIPPON STEEL & SUMITOMO METAL CORPORATION, Tokyo (JP)

(72) Inventors: Masaharu Oka, Tokyo (JP); Nobusato Kojima, Tokyo (JP); Tetsuya Okada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 312 days.

(21) Appl. No.: 15/754,010

(22) PCT Filed: Aug. 22, 2016

(86) PCT No.: PCT/JP2016/074424
§ 371 (c)(1),
(2) Date: Feb. 21, 2018

(87) PCT Pub. No.: WO2017/033901
PCT Pub. Date: Mar. 2, 2017

(65) Prior Publication Data
US 2018/0258514 A1    Sep. 13, 2018

(30) Foreign Application Priority Data

Aug. 24, 2015  (JP) ................................ 2015-164787
Aug. 24, 2015  (JP) ................................ 2015-164788

(51) Int. Cl.
*C22C 38/14* (2006.01)
*C22C 38/12* (2006.01)
(Continued)

(52) U.S. Cl.
CPC .............. *C22C 38/14* (2013.01); *B32B 15/01* (2013.01); *B32B 15/012* (2013.01);
(Continued)

(58) Field of Classification Search
CPC ...... C22C 38/002; C22C 38/001; C22C 38/02; C22C 38/04; C22C 38/06; C22C 38/12;
(Continued)

(56) References Cited

U.S. PATENT DOCUMENTS

2015/0203948 A1*  7/2015  Sugiura ................... C22C 38/26
                                                                  428/659

FOREIGN PATENT DOCUMENTS

EP    2 881 483    6/2015
JP    08-26412     3/1996
(Continued)

*Primary Examiner* — Michael E. La Villa
(74) *Attorney, Agent, or Firm* — Clark & Brody LLP

(57) ABSTRACT

Provided is a galvannealed steel sheet having high strength and excellent deep drawability, and being further excellent in slab cracking resistance and secondary working embrittlement resistance. A base metal steel sheet of the galvannealed steel sheet has a chemical composition containing, in mass %: C: 0.0080% or less; Si: 0.7% or less; Mn: 1.0 to 2.5%; P: more than 0.030 to 0.048%; S: 0.025% or less; Al: 0.005 to 0.20%; N: 0.010% or less; Ti: 0.005 to 0.040%; Nb: 0.005 to 0.060%; and B: 0.0005 to 0.0030%, with the balance being Fe and impurities, satisfying Formula (1) to (4). A galvannealed layer contains 7 to 15 mass % of Fe.

$$25 \times P + 4 \times Si \leq 3.6 \tag{1}$$

$$B - X1 \geq 0.0005 \tag{2}$$

$$C - (12/93) \times Nb - X2 \geq -0.0035 \tag{3}$$

$$110 \times Si + 48 \times Mn + 550 \times P \geq 120 \tag{4}$$

9 Claims, 2 Drawing Sheets

F1

(51) Int. Cl.
| | |
|---|---|
| C22C 38/02 | (2006.01) |
| C22C 38/04 | (2006.01) |
| C22C 38/06 | (2006.01) |
| C22C 38/00 | (2006.01) |
| C21D 8/02 | (2006.01) |
| B32B 15/01 | (2006.01) |
| C21D 9/46 | (2006.01) |
| C21D 6/00 | (2006.01) |
| C23C 2/02 | (2006.01) |
| C23C 2/06 | (2006.01) |
| C23C 2/40 | (2006.01) |
| C23C 2/28 | (2006.01) |
| B32B 15/18 | (2006.01) |
| B32B 15/04 | (2006.01) |
| C22C 38/48 | (2006.01) |
| C22C 38/26 | (2006.01) |
| C22C 38/28 | (2006.01) |
| C23C 30/00 | (2006.01) |
| C23C 2/12 | (2006.01) |

(52) U.S. Cl.
CPC .......... *B32B 15/013* (2013.01); *B32B 15/015* (2013.01); *B32B 15/04* (2013.01); *B32B 15/043* (2013.01); *B32B 15/18* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/26* (2013.01); *C22C 38/28* (2013.01); *C22C 38/48* (2013.01); *C23C 2/02* (2013.01); *C23C 2/06* (2013.01); *C23C 2/12* (2013.01); *C23C 2/28* (2013.01); *C23C 2/285* (2013.01); *C23C 2/40* (2013.01); *C23C 30/00* (2013.01); *C23C 30/005* (2013.01); *Y10T 428/12757* (2015.01); *Y10T 428/12799* (2015.01); *Y10T 428/12951* (2015.01); *Y10T 428/12958* (2015.01); *Y10T 428/12965* (2015.01)

(58) Field of Classification Search
CPC ......... C22C 38/48; C22C 38/26; C22C 38/28; C22C 38/14; C22C 38/004; C21D 8/0236; C21D 8/0273; C21D 8/0205; C21D 8/0226; C21D 8/0263; C21D 6/005; C21D 6/008; C21D 9/46; B32B 15/015; B32B 15/013; B32B 15/01; B32B 15/012; B32B 15/04; B32B 15/043; B32B 15/18; C23C 2/02; C23C 2/06; C23C 2/40; C23C 2/28; C23C 2/12; C23C 2/285; C23C 30/00; C23C 30/005; Y10T 428/12747; Y10T 428/12799; Y10T 428/12951; Y10T 428/12958; Y10T 428/12965; Y10T 428/12757

See application file for complete search history.

(56) References Cited

FOREIGN PATENT DOCUMENTS

| | | |
|---|---|---|
| JP | 08-30217 | 3/1996 |
| JP | 2526320 | 8/1996 |
| JP | 2526322 | 8/1996 |
| JP | 63-47338 | 2/1998 |
| JP | 2001-131695 | 5/2001 |
| JP | 4094498 | 6/2008 |
| JP | 2015-063729 | 4/2015 |

* cited by examiner

GALVANNEALED STEEL SHEET AND PRODUCTION METHOD THEREOF

TECHNICAL FIELD

The present invention relates to a galvannealed steel sheet and a production method thereof, more specifically to a high-strength galvannealed steel sheet having a tensile strength of 440 MPa or more and a production method thereof.

BACKGROUND ART

Recently, weight reduction of automobiles has been demanded to reduce carbon dioxide gas emissions and fuel consumption. Moreover, there is an increasing demand for improvement in collision safety performances of automobiles. Increasing strengths of steel products is effective in the weight reduction of automobiles and the improvement in collision safety performances.

Of automobile components, panel components are also required to have a high press formability (deep drawability). Therefore, soft steel sheets having high workabilities have been used for conventional panel components. However, the above panel components are also demanded to have the increased strengths described above.

Patent Literatures 1 to 3 propose cold-rolled steel sheets each of which has high strength and is excellent in deep drawability. The cold-rolled steel sheets disclosed in these literatures each has a high average r value $r_m$, which is defined by the following formula:

$$r_m = (r_L + 2 \times r_{45} + r_C)/4$$

The symbol n in the above formula denotes an r value in a direction parallel to a rolling direction of a cold-rolled steel sheet. The symbol r s denotes an r value in a direction angled at 45° to the rolling direction. The symbol re denotes an r value in a direction orthogonal to the rolling direction. The r value is called the Lankford value, which indicates a plastic anisotropy of a steel sheet.

Of the above panel components, shaped components such as an side frame outer are required to have not only a high average r value $r_m$ but also a low in-plane anisotropy $\Delta r$ value, which is defined by the following formula:

$$\Delta r = (r_L + r_C)/2 - r_{45}$$

Of the side frame outer, four corner portions of a region receiving a door are required to have high values of $r_{45}$, and a hinge mounting portion of the door is required to have a high value of $r_L$. These requirements can be satisfied when the in-plane anisotropy $\Delta r$ value is small. Patent Literature 4 proposes a high-strength cold-rolled steel sheet for deep drawing that is excellent in average r value $r_m$ and in-plane anisotropy $\Delta r$ value.

Now, as cold-rolled steel sheets for automobile steel sheets, galvannealed steel sheets are used in some cases. The galvannealed steel sheets are produced by performing galvanizing treatment followed by alloying treatment. The galvannealed steel sheets are normally produced by an in-line annealing system, represented by the Sendzimir process. In the in-line annealing system, represented by the Sendzimir process, annealing equipment and galvanizing equipment are continuously disposed. Therefore, the galvanizing treatment is continuously performed after the annealing. A galvannealed layer of a galvannealed steel sheet is made of intermetallic compounds that are poor in deformability and restraints a base metal steel sheet of the galvannealed steel sheet from deforming. For that reason, an average r value of a galvannealed steel sheet is less than an average r value of a steel sheet without a galvannealed layer.

A high-strength cold-rolled steel sheet having a high deep drawability has a high content of Si (silicon) so as to have high strength. A high content of Si leads to concentration of Si on a steel sheet surface, resulting in a generation of Si oxide ($SiO_2$). The Si oxide is likely to bring about ungalvanized areas in galvanizing treatment.

Patent Literatures 5 to 7 propose production methods of a high-strength cold-rolled steel sheet that hardly brings about ungalvanized areas while having a high content of Si. According to these literatures, Ni pre-plating is performed on a cold-rolled steel sheet that is annealed in advance. The steel sheet subjected to the Ni pre-plating is rapidly heated to 430 to 500° C. and subjected to galvanizing treatment. After the galvanizing treatment, the steel sheet is heated to 470 to 550° C. for alloying treatment. These production methods make it possible to produce a galvannealed steel sheet while maintaining a workability of an original cold-rolled steel sheet. Moreover, performing the Ni pre-plating makes ungalvanized areas difficult to occur even in the case of a high content of Si.

Now, when a cast slab is cooled to a room temperature, a crack may occur in the slab due to internal stresses (including thermal stress, transformation stress, etc.). In addition, in handling the slab for moving the slab, and in stacking the slab, an external stress may be applied to the slab, resulting in a crack occurring in the slab. Such cracks are called "slab cracks". A resistance against slab cracks is called a "slab cracking resistance".

Moreover, where a tension or an impulsive force additionally acts on an end portion of a formed item resulting from deep drawing work on a cold-rolled steel sheet, a brittle fracture may occur in a direction of the drawing. Such a phenomenon is called "secondary working embrittlement". A resistance against the secondary working embrittlement is called a "secondary working embrittlement resistance".

Galvannealed steel sheets produced by the production methods disclosed in Patent Literatures 4 to 7 may be low in the slab cracking resistance and the secondary working embrittlement resistance described above.

CITATION LIST

Patent Literature

Patent Literature 1: Japanese Patent Publication No. H8-30217
Patent Literature 2: Japanese Patent Publication No. H8-26412
Patent Literature 3: Japanese Patent Application Publication No. 2001-131695
Patent Literature 4: Japanese Patent No. 4094498
Patent Literature 5: Japanese Patent No. 2526320
Patent Literature 6: Japanese Patent No. 2526322
Patent Literature 7: Japanese Patent Application Publication No. 2015-063729

SUMMARY OF INVENTION

Technical Problem

An objective of the present invention is to provide a high-strength galvannealed steel sheet having a high strength and an excellent deep drawability, and being further excellent in slab cracking resistance and secondary working embrittlement resistance, and to provide a production method of the high-strength galvannealed steel sheet.

Solution to Problem

The galvannealed steel sheet according to the present invention includes a base metal steel sheet and a galvannealed layer. The base metal steel sheet has a chemical composition containing, in mass %: C: 0.0080% or less; Si: 0.7% or less; Mn: 1.0 to 2.5%; P: more than 0.030 to 0.048%; S: 0.025% or less; Al: 0.005 to 0.20%; N: 0.010% or less; Ti: 0.005 to 0.040%; Nb: 0.005 to 0.060%; and B: 0.0005 to 0.0030%, with the balance being Fe and impurities, the chemical composition satisfying Formula (1) to Formula (4). The galvannealed layer is formed on a surface of the base metal steel sheet and contains 7 to 15 mass % of Fe. The galvannealed steel sheet has an average r value of 1.2 or more, an in-plane anisotropy Δr value of −0.5 to 0.5, and a tensile strength of 440 MPa or more.

$$25 \times P + 4 \times Si \leq 3.6 \tag{1}$$

$$B - X1 \geq 0.0005 \tag{2}$$

$$C - (12/93) \times Nb - X2 \geq -0.0035 \tag{3}$$

$$110 \times Si + 48 \times Mn + 550 \times P \geq 120 \tag{4}$$

Here, for the symbols of elements in the Formulae, the contents of corresponding elements (in mass %) are substituted.

In addition, the symbol X1 in Formula (2) is defined as follows.

$$X1 = (11/14)[N - (14/48) \times Ti] \text{ when } N - (14/48) \times Ti > 0,$$
and
$$X1 = 0 \text{ when } N - (14/48) \times Ti \leq 0$$

In addition, X2 in Formula (3) is defined as follows, $$X2 = (12/48)[Ti - (48/14) \times N] \text{ when } Ti - (48/14) \times N > 0,$$
and
$$X2 = 0 \text{ when } Ti - (48/14) \times N \leq 0$$

A production method of a galvannealed steel sheet according to the present invention includes: a step of producing a hot-rolled steel sheet by performing hot rolling on a slab having the above chemical composition at a rolling finishing temperature of 800 to 950° C., and coiling the hot-rolled steel sheet at a coiling temperature of 600 to 760° C.; a step of producing a cold-rolled steel sheet by performing cold rolling on the hot-rolled steel sheet; a step of producing a base metal steel sheet by performing annealing treatment on the cold-rolled steel sheet; a step of performing galvanizing treatment on the base metal steel sheet; and a step of performing alloying treatment in which the galvanized base metal steel sheet is retained at an alloying treatment temperature of 470 to 620° C. for 10 to 40 seconds.

Advantageous Effects of Invention

The galvannealed steel sheet according to the present invention has a high strength and an excellent deep drawability, and is further excellent in slab cracking resistance and secondary working embrittlement resistance. The production method according to the present invention is capable of producing the galvannealed steel sheet.

DESCRIPTION OF EMBODIMENTS

The present inventors conducted investigations and studies about a method for obtaining excellent slab cracking resistance and secondary working embrittlement resistance for a galvannealed steel sheet having a high strength and an excellent deep drawability (a high average r value and a low in-plane anisotropy Δr value). As a result, the present inventors obtained the following findings.

(A) To obtain an excellent secondary working embrittlement resistance while maintaining a high tensile strength of 440 MPa or more, it is necessary to suppress contents of P (phosphorus) and Si in a base metal steel sheet of a galvannealed steel sheet.

It is defined as follows: F1=25×P+4×Si. For symbols of elements shown in the definition of F1, contents (in mass %) of corresponding elements in the base metal steel sheet of the galvannealed steel sheet are substituted. F1 is an index of the secondary working embrittlement resistance.

Figure 1:
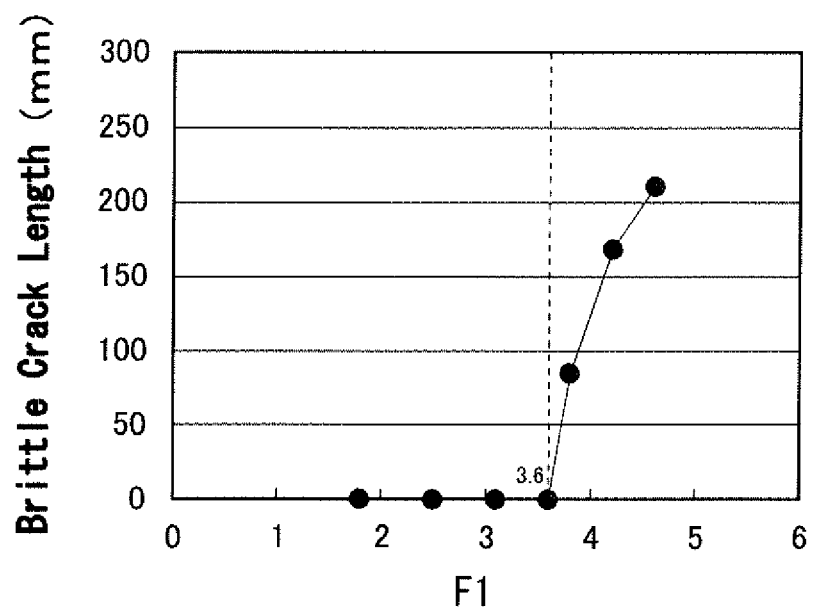
FIG. 1 is a graph illustrating a relation between F1=25×P+4×Si and brittle crack length (mm) that is obtained through a preliminary test conducted by the same method as that of a test for evaluating secondary working embrittlement resistance, which will be described later.

FIG. 1 is a graph illustrating a relation between F1 and brittle crack length (mm), and is created through a test for evaluating secondary working embrittlement resistance, which will be described later. FIG. 1 was obtained by the following method. The test for evaluating secondary working embrittlement resistance described later was conducted. Chemical compositions of test materials fell within a range described in the present invention, except for F1, and also satisfied Formula (2) to Formula (4). As a result of observing a test specimen after the test, when a brittle crack occurred, a brittle crack length was measured. As a result of the measurement, the relation between F1 and the brittle crack length was as follows. A brittle crack length of a sample having F1=1.8 was zero. A brittle crack length of a sample having F1=2.5 was zero. A brittle crack length of a sample having F1=3.1 was zero. A brittle crack length of a sample having F1=3.6 was zero. A brittle crack length of a sample having F1=3.8 was 85 mm. A brittle crack length of a sample having F1=4.2 was 168 mm. A brittle crack length of a sample having F1=4.6 was 210 mm. Based on the obtained brittle crack lengths, FIG. 1 was created.

Referring to FIG. 1, when F1 becomes more than 3.6, the brittle crack length remarkably increases with an increase in F1. Meanwhile, when F1 is 3.6 or less, a brittle crack hardly occurs. Therefore, a galvannealed steel sheet satisfying the formula (1) can increase the secondary working embrittlement resistance while maintaining a high strength of 440 MPa or more.

$$25 \times P + 4 \times Si \leq 3.6 \tag{1}$$

(B) The slab cracking resistance and the secondary working embrittlement resistance can be increased by increasing a grain boundary strength. When amounts of dissolved B (boron) and dissolved C are appropriate, the grain boundary strength is increased. Specifically, when Formula (2) and Formula (3) are satisfied, appropriate amounts of dissolved B and dissolved C can be ensured, which can increase the slab cracking resistance and the secondary working embrittlement resistance.

$$B-X1\geq 0.0005 \qquad (2)$$

$$C-(12/93)\times Nb-X2\geq -0.0035 \qquad (3)$$

Here, for the symbols of elements in the Formulae, the contents of corresponding elements (in mass %) are substituted.

The symbol X1 in Formula (2) is defined as follows.

$$X1=(11/14)[N-(14/48)\times Ti] \text{ when } N-(14/48)\times Ti>0,$$
and $$X1=0 \text{ when } N-(14/48)\times Ti\leq 0$$

The symbol X2 in Formula (3) is defined as follows, $$X2=(12/48)[Ti-(48/14)\times N] \text{ when } Ti-(48/14)\times N>0,$$
and $$X2=0 \text{ when } Ti-(48/14)\times N\leq 0$$

It is defined as follows: F2=B−X1. It is defined as follows: F3=C−(12/93)×Nb−X2. F2 is an index of the amount of dissolved B, and F3 is an index of the amount of dissolved C. When F2 is 0.0005 or more, an adequate amount of dissolved B, which contributes to the grain-boundary strengthening, is present in steel. When F3 is −0.0035 or more, an adequate amount of dissolved C, which contributes to the grain boundary strength, is present in steel. Therefore, when a base metal steel sheet of a galvannealed steel sheet satisfying Formula (1) further satisfies Formula (2) and Formula (3), the grain boundary strength is increased, and the slab cracking resistance and the secondary working embrittlement resistance are increased.

(C) To have a tensile strength of 440 MPa or more while satisfying Formula (1) to Formula (3) described above, a base metal steel sheet of a galvannealed steel sheet satisfies Formula (4):

$$110\times Si+48\times Mn+550\times P\geq 120 \qquad (4)$$

It is defined as follows: F4=110×Si+48×Mn+550×P. F4 is an index of a tensile strength of a steel sheet. When F4 is 120 or more, a tensile strength of a galvannealed steel sheet satisfying Formula (1) to Formula (3) becomes 440 MPa or more.

(D) Moreover, the present inventors found that, by setting a content of P in a base metal steel sheet of a galvannealed steel sheet at 0.048% or less, the slab cracking resistance of the galvannealed steel sheet remarkably increases. Description will be made below about this regard.

Figure 2:
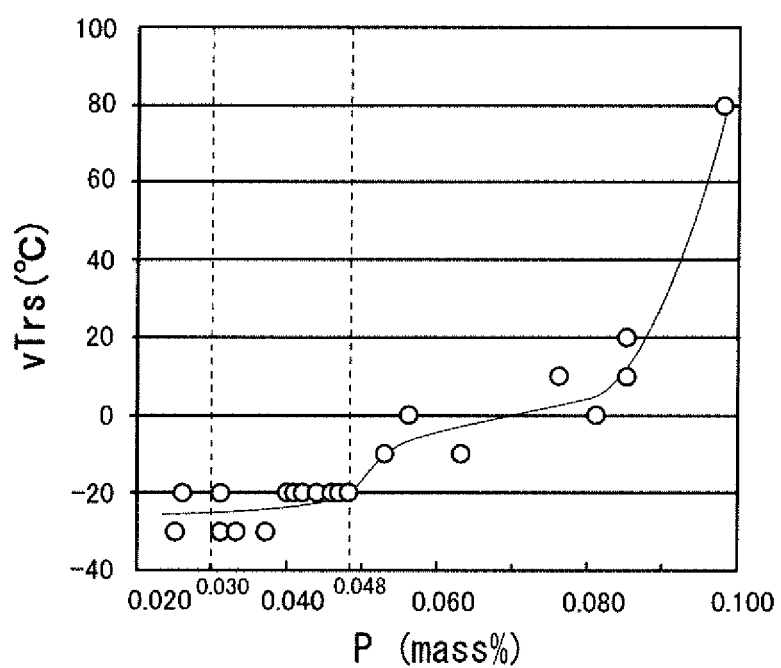
FIG. 2 is a graph illustrating a relation between a ductile-brittle transition temperature vTrs (° C.) and the content of P (in mass %) in a base metal steel sheet of a galvannealed steel sheet, and is obtained through a test for evaluating slab cracking resistance in Example.

FIG. 2 is a graph illustrating a relation between a ductile-brittle transition temperature vTrs (° C.) and the content of P (in mass %) in a galvannealed steel sheet, and is obtained through a test for evaluating slab cracking resistance, which will be described later.

Referring to FIG. 2, until the content of P decreases to 0.048%, the ductile-brittle transition temperature vTrs remarkably decreases to −20° C. or less with a decrease in the content of P. Meanwhile, when the content of P becomes 0.048% or less, although the content of P decreases, the ductile-brittle transition temperature vTrs does not decrease to that extent from −20° C. That is, in FIG. 2, there is an inflection point in a vicinity of a content of P=0.048%.

Therefore, a content of P of 0.048% or less results in an excellent slab cracking resistance. Meanwhile, P increases a strength of steel, and a content of P of 0.030% or less makes the tensile strength less than 440 MPa. Therefore, when the above (A) to (D) are satisfied, and the content of P is more than 0.030% to 0.048% or less, it is possible to obtain a galvannealed steel sheet that is excellent in the slab cracking resistance and has a tensile strength of a 440 MPa or more and an excellent secondary working embrittlement resistance.

(E) At a time when hot rolling is performed on a slab having a chemical composition satisfying Formula (1) to Formula (4) described above, an excellent deep drawability is obtained by setting a finishing temperature FT (° C.) at 800 to 950° C. and setting a coiling temperature CT (° C.) at 600 to 760° C. That is, the average r value is made 1.2 or more, and the in-plane anisotropy Δr value is made −0.5 to 0.5.

The galvannealed steel sheet according to the present invention, which is completed based on the above findings, includes a base metal steel sheet and a galvannealed layer. The base metal steel sheet has a chemical composition containing, in mass %: C: 0.0080% or less; Si: 0.7% or less; Mn: 1.0 to 2.5%; P: more than 0.030% to 0.048%; S: 0.025% or less; Al: 0.005 to 0.20%; N: 0.010% or less; Ti: 0.005 to 0.040%; Nb: 0.005 to 0.060%; and B: 0.0005 to 0.0030%, with the balance being Fe and impurities, the chemical composition satisfying Formula (1) to Formula (4). The galvannealed layer is formed on a surface of the base metal steel sheet and contains 7 to 15 mass % of Fe. The galvannealed steel sheet has an average r value of 1.2 or more, an in-plane anisotropy Δr value of −0.5 to 0.5, and a tensile strength of 440 MPa or more.

$$25\times P+4\times Si\leq 3.6 \qquad (1)$$

$$B-X1\geq 0.0005 \qquad (2)$$

$$C-(12/93)\times Nb-X2\geq -0.0035 \qquad (3)$$

$$110\times Si+48\times Mn+550\times P\geq 120 \qquad (4)$$

Here, for the symbols of elements in the Formulae, the contents of corresponding elements (in mass %) are constituted.

The symbol X1 in Formula (2) is defined as follows.

$$X1=(11/14)[N-(14/48)\times Ti] \text{ when } N-(14/48)\times Ti>0,$$
and $$X1=0 \text{ when } N-(14/48)\times Ti\leq 0$$

The symbol X2 in Formula (3) is defined as follows.

$$X2=(12/48)[Ti-(48/14)\times N] \text{ when } Ti-(48/14)\times N>0,$$
and $$X2=0 \text{ when } Ti-(48/14)\times N\leq 0.$$

The above chemical composition may contain C: less than 0.0040%, Ti: 0.005 to 0.035%, and Nb: 0.005 to 0.035%.

The above chemical composition may contain C: 0.0040 to 0.0080%, Ti: 0.005 to 0.040%, and Nb: 0.005 to 0.060%. In this case, a value of Formula (3) is preferably −0.0002 or more.

A production method of a galvannealed steel sheet according to the present invention includes: a step of producing a hot-rolled steel sheet by performing hot rolling on a slab having the above chemical composition at a rolling finishing temperature of 800 to 950° C., and coiling the hot-rolled steel sheet at a coiling temperature of 600 to 760° C.; a step of producing a cold-rolled steel sheet by performing cold rolling on the hot-rolled steel sheet; a step of producing a base metal steel sheet by performing annealing treatment on the cold-rolled steel sheet; a step of performing galvanizing treatment on the base metal steel sheet; and a step of performing alloying treatment in which the galvanized base metal steel sheet is retained at an alloying treatment temperature of 470 to 620° C. for 10 to 40 seconds.

As to the step of producing the above base metal steel sheet and the step of galvanizing, the base metal steel sheet (steel strip) may be subjected to in-line annealing such as what is called the Sendzimir process, and thereafter introduced into a galvanizing bath under a protective atmosphere. Alternatively, a cold-rolled steel sheet subjected to annealing treatment (i.e., the base metal steel sheet) may be taken out of a furnace (what is called out-of-line annealing), subjected to appropriate preliminary cleaning, thereafter subjected to preparations such as Ni pre-plating treatment, as necessary, heated to 430 to 480° C. under a protective atmosphere, and thereafter introduced in a galvanizing bath.

In a case where the above in-line annealing is performed, oxidizable element such as Si is likely to be concentrated on a surface. For that reason, when the in-line annealing is performed on a cold-rolled steel sheet containing Si at a content of 0.25% or more, an ungalvanized area becomes likely to occur. Therefore, when the content of Si is 0.25% or more, out-of-line annealing is preferably performed to produce a base metal steel sheet, the base metal steel sheet produced by the out-of-line annealing is subjected to Ni pre-plating treatment. In this case, it is possible to perform the galvanizing treatment while suppressing occurrence of an ungalvanized area. Performing the Ni pre-plating treatment on a base metal steel sheet containing Si at a content of less than 0.25% causes no adverse effect.

Hereafter, the galvannealed steel sheet according to the present invention will be described in detail. The sign "%" concerning each element means mass percent unless otherwise noted.

[Configuration of Galvannealed Steel Sheet]

The galvannealed steel sheet according to the present invention includes a base metal steel sheet and a galvannealed layer. The galvannealed layer is formed on a surface of the base metal.

[Chemical Composition of Base Metal Steel Sheet]

The chemical composition of the base metal steel sheet contains the following elements.

C: 0.0080% or Less

Carbon (C) is unavoidably contained. C increases a strength of steel. Furthermore, C segregates in grain boundaries in a form of dissolved C, suppressing secondary working embrittlement and slab cracking resistance of steel. However, an excessively high content of C results in a decrease in a deep drawability of steel. Specifically, TiC and NbC are excessively generated, increasing an in-plane anisotropy Δr value. Furthermore, TiC and NbC suppress grain growth in annealing, decreasing an average r value. Consequently, the content of C is 0.0080% or less.

A lower limit of the content of C to further increase a strength and a secondary working embrittlement is preferably 0.0008%, more preferably 0.0021%. An upper limit of the content of C to obtain a further excellent deep drawability is preferably 0.0070%, more preferably 0.0050%.

For improvement particularly in the high strength and the secondary working embrittlement resistance, a preferable content of C is 0.0040 to 0.0080%. For improvement particularly in the deep drawability, a preferable content of C is less than 0.0040%.

Si: 0.7% or Less

Silicon (Si) is unavoidably contained. Si increases the strength of steel sheet through solid-solution strengthening. However, when the content of Si is excessively high, the secondary working embrittlement resistance decreases, and at the same time, ungalvanized areas become likely to occur in a galvanizing step (in a case of the in-line annealing). Furthermore, the excessively high content of Si results in a decrease in scale peeling property after hot working and a decrease in flash butt weldability. Consequently, the content of Si is 0.7% or less. If the content of Si is more than 0.7%, ungalvanized areas may occur even when the Ni pre-plating is performed. A lower limit of the content of Si is preferably 0.1%, more preferably 0.2%, still more preferably 0.3%. An upper limit of the content of Si is preferably is 0.6%, more preferably 0.5%.

Mn: 1.0 to 2.5%

Manganese (Mn) increases a strength of the steel sheet through solid-solution strengthening. Furthermore, Mn lowers the $A_{r3}$ transformation point. When the $A_{r3}$ transformation point is lowered, a finishing temperature (FT) in hot rolling can be lowered, and thus it is possible to refine ferrite grains in a hot-rolled steel sheet. An excessively low content of Mn results in failure to provide these effects. Meanwhile, an excessively high content of Mn results in a decrease in toughness of the steel sheet. Consequently, the content of Mn is 1.0 to 2.5%. A lower limit of the content of Mn is preferably 1.2%, more preferably 1.4%. An upper limit of the content of Mn is preferably 2.3%, more preferably 2.1%.

P: More than 0.030 to 0.048%

Phosphorus (P) increases a strength of the steel sheet through solid-solution strengthening. An excessively low content of P makes it difficult to ensure a tensile strength of 440 MPa with the chemical composition according to the present invention. Meanwhile, an excessively high content of P leads to segregation of P in grain boundaries, resulting in a decrease in grain boundary strength. In this case, the slab cracking resistance and the secondary working embrittlement resistance decrease, in particular, and the slab cracking resistance decreases, as illustrated in FIG. 2. Consequently, the content of P is more than 0.030% to 0.048%. A lower limit of the content of P is preferably 0.033%, more preferably 0.035%. An upper limit of the content of P is preferably 0.047%, more preferably 0.045%.

S: 0.025% or Less

Sulfur (S) is unavoidably contained. S decreases a hot workability and toughness of the steel. Consequently, the content of S is 0.025% or less. An upper limit of the content of S is preferably 0.010%, more preferably 0.005%. The content of S is preferably as low as possible. However, in consideration of costs necessary for desulfurization, a lower limit of the content of S is preferably 0.0005%.

Al: 0.005 to 0.20%

Aluminum (Al) deoxidizes the steel. Furthermore, Al forms AlN, inhibiting grains from coarsening. Moreover, Al is a ferrite stabilizing element as with Si and can be contained in substitution for Si. An excessively low content of Al results in failure to provide these effects. Meanwhile, an excessively high content of Al results in a decrease in toughness of the steel. Consequently, the content of Al is 0.005 to 0.20%. A lower limit of the content of Al is preferably 0.01%, more preferably 0.02%. An upper limit of the content of Al is preferably 0.10%, more preferably 0.06%.

N: 0.010% or Less

Nitrogen (N) is unavoidably contained. N forms a nitride (AlN), inhibiting grains from coarsening. However, an excessively high content of N results in a decrease in toughness of the steel. Consequently, the content of N is 0.010% or less. An upper limit of the content of N is preferably 0.007%, more preferably 0.005%. N forms carbo-nitrides and the like of Al and Ti, inhibiting grains from coarsening. Consequently, a lower limit of the content of N is preferably 0.001%.

Ti: 0.005 to 0.040%,

Titanium (Ti) forms a fine carbo-nitride of Ti, inhibiting grains from coarsening. Furthermore, Ti forms TiN, reducing dissolved N, so as to inhibit BN from precipitating. This inhibition allows dissolved B to increase the slab cracking resistance and the secondary working embrittlement resistance. An excessively low content of Ti results in failure to provide these effects. Meanwhile, an excessively high content of Ti causes the carbo-nitride of Ti to coarsen, decreasing toughness of the steel. Furthermore, the excessively high content of Ti causes TiP to be generated, decreasing the average r value. Consequently, the content of Ti is 0.005 to 0.040%. A lower limit of the content of Ti is preferably 0.010%, more preferably 0.015%. An upper limit of the content of Ti is preferably 0.035%, more preferably 0.030%.

When the content of C is less than 0.0040%, a preferable range of the content of Ti is 0.005 to 0.035%. When the content of C is 0.0040 to 0.0080%, a preferable range of the content of Ti is 0.005 to 0.040%.

Nb: 0.005 to 0.060%

Niobium (Nb) forms a fine carbo-nitride of Nb, inhibiting grains from coarsening. An excessively low content of Nb results in failure to provide this effect. Meanwhile, an excessively high content of Nb causes NbC to precipitate in grain boundaries, which decreases the slab cracking resistance and the secondary working embrittlement resistance. Consequently, the content of Nb is 0.005 to 0.060%. A lower limit of the content of Nb is preferably 0.010%, more preferably 0.015%. An upper limit of the content of Nb is preferably 0.040%, more preferably 0.035%.

When the content of C is less than 0.0040%, a preferable range of the content of Nb is 0.005 to 0.035%. When the content of C is 0.0040 to 0.0080%, a preferable range of the content of Nb is 0.005 to 0.060%.

B: 0.0005 to 0.0030%

Boron (B) is dissolved and segregates in grain boundaries, inhibiting P and S from segregating in the grain boundaries. This inhibition results in an increase in the slab cracking resistance and the secondary working embrittlement resistance. An excessively low content of B results in failure to provide this effect. Meanwhile, an excessively high content of B causes a coarse nitride (BN) to be generated in grain boundaries, decreasing the slab cracking resistance and the secondary working embrittlement resistance of the steel. The coarse BN precipitating in the grain boundaries further decreases a hot workability and toughness of the steel. Consequently, the content of B is 0.0005 to 0.0030%. A lower limit of the content of B is preferably 0.0010%, more preferably 0.0015%. An upper limit of the content of B is preferably 0.0025%, more preferably 0.0020%.

The chemical composition of the base metal steel sheet of the galvannealed steel sheet according to the present invention contains the balance being Fe and impurities. Here, the impurities mean elements that are mixed from ores and scraps used as raw material of the above base metal steel sheet, a production environment, and the like, in producing the base metal steel sheet in an industrial manner, and allowed to the extent that they do not adversely affect the above base metal steel sheet.

[Formula (1) to Formula (4)]

The chemical composition of the above base metal steel sheet further satisfies Formula (1) to Formula (4) below.

$$25 \times P + 4 \times Si \leq 3.6 \quad (1)$$

$$B - X1 \geq 0.0005 \quad (2)$$

$$C - (12/93) \times Nb - X2 \geq -0.0035 \quad (3)$$

$$110 \times Si + 48 \times Mn + 550 \times P \geq 120 \quad (4)$$

Here, for the symbols of elements in the Formulae, the contents of corresponding elements (in mass %) are substituted.

[Formula (1)]

The chemical composition of the above base metal steel sheet satisfies Formula (1).

$$25 \times P + 4 \times Si \leq 3.6 \quad (1)$$

It is defined as follows: $F1 = 25 \times P + 4 \times Si$. F1 is an index of the secondary working embrittlement resistance. As illustrated in FIG. 1, when F1 becomes more than 3.6, the brittle crack length remarkably increases, which indicates a decrease in the secondary working embrittlement resistance. When F1 is 3.6 or less, the occurrence of a brittle crack is sufficiently inhibited, increasing the secondary working embrittlement resistance.

[Formula (2)]

The chemical composition of the above base metal steel sheet further satisfies Formula (2):

$$B - X1 \geq 0.0005 \quad (2)$$

Here, the symbol X1 in Formula (2) is defined as follows.

$$X1 = (11/14)[N - (14/48) \times Ti] \text{ when } N - (14/48) \times Ti > 0.$$
$$X1 = 0 \text{ when } N - (14/48) \times Ti \leq 0.$$

It is defined as follows: $F2 = B - X1$. F2 is an index of the amount of dissolved B and is also an index of the slab cracking resistance and the secondary working embrittlement resistance. X1 being more than zero theoretically means that N is not sufficiently immobilized by Ti, and there is N that can be coupled with B. X1 being zero or less theoretically means that N is sufficiently immobilized by Ti, and there is no N that can be coupled with B.

When F2 is less than 0.0005, dissolved B cannot sufficiently segregate in grain boundaries. In this case, P and S segregate in grain boundaries, which make a slab crack or secondary working embrittlement likely to occur. When F2 is 0.0005 or more, dissolved B sufficiently segregates in grain boundaries, inhibiting grain-boundary segregation of P and S. This inhibition increases the grain boundary strength, which makes it possible to provide excellent slab cracking resistance and secondary working embrittlement resistance.

[Formula (3)]

The chemical composition of the above base metal steel sheet further satisfies Formula (3):

$$C - (12/93) \times Nb - X2 \geq -0.0035 \quad (3)$$

Here, the symbol X2 in Formula (3) is defined as follows.

$$X2 = (12/48)[Ti - (48/14) \times N] \text{ when } Ti - (48/14) \times N > 0.$$
$$X2 = 0 \text{ when } Ti - (48/14) \times N \leq 0.$$

It is defined as follows: $F3 = C - (12/93) \times Nb - X2$. F3 is an index of the amount of dissolved C and is also an index of the slab cracking resistance and the secondary working embrittlement resistance. X2 being more than zero theoretically means that there is Ti in an amount more than that to be coupled with N, therefore meaning that there is Ti that can be coupled with C. X2 being zero or less theoretically means that all Ti are coupled with N, and there is no Ti that can be coupled with C.

When F3 is less than −0.0035, the amount of dissolved C is inadequate, and a strength of grain boundaries is not increased sufficiently. In this case, the slab cracking resistance and the secondary working embrittlement resistance decrease. When F3 is −0.0035 or more, there is an adequate amount of dissolved C for increasing the grain boundary strength. Therefore, the slab cracking resistance and the secondary working embrittlement resistance increase. A lower limit of F3 is preferably −0.0015, more preferably 0.0002. F3 is preferably 0.0025 or less, more preferably 0.0018 or less. In this case, the deep drawability further increases.

When the content of C is 0.0040 to 0.0080%, a preferable lower limit of F3 is −0.0002.

[Formula (4)]

The chemical composition of the above steel sheet further satisfies Formula (4):

$$110 \times Si + 48 \times Mn + 550 \times P \geq 120 \quad (4)$$

It is defined as follows: F4=110×Si+48×Mn+550×P. F4 is an index of a tensile strength of the steel sheet in a case where the content of C, the content of Ti, and the content of Nb fall within the ranges described above. When F4 is less than 120, the tensile strength of the steel sheet becomes less than 440 MPa, failing to obtain a high strength. When F4 is 120 or more, the tensile strength of a steel sheet becomes 440 MPa or more as long as the steel sheet has a chemical composition elements of which fall within the range described above and that satisfies Formula (1) to Formula (3) described above. F4 is preferably 130 or more.

[Galvannealed Layer]

The galvannealed layer is formed on a surface of the base metal steel sheet described above. The galvannealed layer contains 7 to 15 mass % of Fe. A content of Fe less than 7% results in a decrease in spot weldability. Meanwhile, a content of Fe more than 15% results in a decrease in adhesiveness of the galvannealed layer. A content of Fe falling within 7 to 15% results in excellent spot weldability and adhesiveness. Performing alloying treatment under conditions described later brings the content of Fe in the galvannealed layer within the above range. A preferable lower limit of the content of Fe in the galvannealed layer is 8%, and a preferable upper limit of the content of Fe is 12%.

The chemical composition of the galvannealed layer contains Fe and Al described above, with the balance being Zn and impurities. Al is contained in the galvanizing bath described above. In a case where Ni pre-plating treatment described later is performed in a producing step, the chemical composition of the galvannealed layer may contain Ni.

A coating weight of the galvannealed layer is not limited to a specific amount. From the viewpoint of corrosion resistance, a preferable coating weight of the galvannealed layer is 5 g/m$^2$ or more in terms of Zn coating amount per side. From the viewpoint of the workability and the adhesiveness of the galvannealed layer, a preferable upper limit of Zn coating amount per side of the galvannealed layer is 100 g/m$^2$.

[Average r Value]

The galvannealed steel sheet according to the present invention has an average r value $r_m$ of 1.2 or more, the average r value $r_m$ being defined by Formula (A):

$$r_m = (r_L + 2 \times r_{45} + r_C)/4 \quad (A)$$

The symbol $r_L$ in the above Formula (A) is an r value in a direction parallel to a rolling direction in the galvannealed steel sheet. The symbol $r_{45}$ denotes an r value in a direction angled at 45° to the rolling direction. The symbol $r_C$ denotes an r value in a direction orthogonal to the rolling direction. The r value is called the Lankford value, which indicates a plastic anisotropy of a steel sheet.

Furthermore, the galvannealed steel sheet according to the present invention has an in-plane anisotropy Δr value of −0.5 to 0.5, the in-plane anisotropy Δr value being defined by Formula (B):

$$\Delta r = (r_L + r_C)/2 - r_{45} \quad (B)$$

Automobile components having high reduction rates, which is represented by a side frame outer, is required to have an excellent deep drawability. An average r value $r_m$ of 1.2 or more provides the excellent deep drawability.

Furthermore, of the side frame outer, four corner portions of a region receiving a door are required to have high values of $r_{45}$, and a hinge mounting portion of the door is required to have a high value of $r_L$. An in-plane anisotropy Δr value of −0.5 to 0.5 can satisfy these requirements, providing the excellent deep drawability.

[Other Respects]

In the galvannealed steel sheet according to the present invention, from the viewpoint of paintability and weldability, an upper plating layer may be formed on the galvannealed layer described above. In addition, from the viewpoint of improving paintability, corrosion resistance, lubricity, weldability, and the like, various chemical treatments including chromate treatment, phosphate treatment, and other treatments may be performed on the galvannealed steel sheet according to the present invention.

[Production Method]

The following is an example of a production method of the galvannealed steel sheet according to the present invention.

The present production method includes a hot rolling step, a cold rolling step, an annealing process, a galvanizing treatment process, and an alloying treatment process. The steps will be described below in detail.

[Hot Rolling Step]

In the hot rolling step, first, a molten steel having the chemical composition described above (satisfying Formula (1) to Formula (4)) is produced by a well-known method. The produced molten steel is cast by a well-known method to be produced into a slab. A cooling method in the casting is, for example, a well-known slow cooling or air cooling.

The produced slab is subjected to hot rolling to be produced into a hot-rolled steel sheet. The produced hot-rolled steel sheet is coiled into a coil. In the hot rolling step, the finishing temperature FT and the coiling temperature CT are as follows.

Finishing temperature FT: 800 to 950° C.

In the hot rolling, rough rolling is performed using a roughing mill, and thereafter finish rolling is performed using a finish rolling mill. The finish rolling mill includes a plurality of stands arranged in a row. The stands each have a pair of rolling rolls.

In the hot rolling, the finishing temperature FT (° C.) is defined as a surface temperature of a steel sheet reaching an exit side of a final stand for rolling the steel sheet, in the finish rolling mill. In the present invention, the finishing temperature FT is 800 to 950° C.

When the finishing temperature FT is less than 800° C., the hot rolling results in austenite-ferrite two-phase region rolling, and when the finishing temperature FT is more than 950° C., grains in the hot-rolled steel sheet coarsen. In these cases, the average r value $r_m$ decreases, and the in-plane anisotropy $\Delta r$ increases. When the finishing temperature FT is 800 to 950° C., ferrite grains in the hot-rolled steel sheet become fine. As a result, the average r value $r_m$ becomes 1.2 or more, and the in-plane anisotropy $\Delta r$ value becomes −0.5 to 0.5, provided that other conditions (the chemical composition and the producing condition) are satisfied.

The temperature of heating the slab in the hot rolling is preferably as low as possible, provided that the above finishing temperature FT is satisfied. The less the temperature of heating the slab is, the more the average r value $r_m$ can be made.

Coiling Temperature CT: 600 to 760° C.

The hot-rolled steel sheet subjected to the finish rolling is coiled into a coil. The coiling temperature CT (° C.) is defined as a surface temperature of the hot-rolled steel sheet at a time of starting the coiling. In the present invention, the coiling temperature CT is 600 to 760° C. When the coiling temperature CT is less than 600° C., and when the coiling temperature CT is more than 760° C., Ti carbo-nitride and Nb carbo-nitride fail to precipitate in an appropriate amount of precipitation. In this case, the amount of dissolved C becomes excessively small, resulting in a decrease in the secondary working embrittlement resistance or resulting in a decreased average r value $r_m$ due to a failure to make grains fine.

When the coiling temperature CT is 600 to 760° C., Ti carbo-nitride and Nb carbo-nitride precipitate in an appropriate amount of precipitation, and the amount of dissolved C that contributes to the grain boundary strength becomes an appropriate amount. As a result, the secondary working embrittlement resistance increases, and the average r value $r_m$ also increases.

[Cold Rolling Step]

The produced hot-rolled steel sheet is subjected to cold rolling. In the cold rolling step, a rolling reduction is not necessarily limited. The rolling reduction in the cold rolling step is preferably 75 to 83%. In this case, the average r value $r_m$ further increases, and the in-plane anisotropy $\Delta r$ value further decreases. It should be noted that the rolling reduction need not be limited to the above range. It suffices to perform the cold rolling employing well-known conditions.

[Annealing Treatment Process]

The produced cold-rolled steel sheet is subjected to annealing treatment to be produced into a base metal steel sheet. An annealing temperature is a recrystallization temperature or more and is preferably an Ac1 transformation temperature or less. When the annealing temperature is the recrystallization temperature or more, recrystallization is promoted, which increases a deep drawing workability of the base metal steel sheet and increases secondary working embrittlement resistance.

Unless falling out of the range described above, the annealing temperature is not limited to a particular temperature but, for example, 750 to 850° C. A preferable lower limit of the annealing temperature is 800° C. In this case, the average r value $r_m$ further increases. A preferable upper limit of the annealing temperature is 830° C. In this case, strip buckling is further inhibited from occurring in continuous annealing. The "strip buckling" refers to a phenomenon in which a steel strip is buckled at the time when the steel strip is caused to run into a continuous annealing furnace, with the result that a wrinkle or a crack occurs on steel strip.

[Ni Pre-Plating Treatment Step]

When the content of Si in the base metal steel sheet is 0.25% or more, it is preferable to perform out-of-line annealing on the base metal steel sheet by using annealing equipment disposed outside a galvanizing line, thereafter perform the Ni pre-plating treatment on the base metal steel sheet, heat the base metal steel sheet after subjected to the Ni pre-plating treatment, and thereafter perform galvanizing treatment. A method of the Ni pre-plating treatment is not necessarily limited. The Ni pre-plating treatment may be either electroplating treatment or immersion plating treatment, and it is preferable to employ the electroplating treatment, from the viewpoint of easiness of controlling amount of adhesion. Through the Ni pre-plating treatment, a Ni plated layer is formed on the base metal steel sheet. Performing the Ni pre-plating treatment remarkably inhibits ungalvanized areas. A preferable coating weight of the Ni plated layer is 0.2 to 2 $g/m^2$. In this case, through the Ni pre-plating treatment, Ni in an amount equivalent to 30 to 65% of Ni precipitating on the surface of the base metal steel sheet is contained in the galvannealed layer after the alloying treatment. As a plating bath for Ni electroplating, for example, the Watts bath can be used, but not necessarily limited thereto.

In the present production method, the Ni pre-plating treatment needs not be performed. In this case, the galvanizing treatment process and the alloying treatment process are performed after the annealing process.

[Galvanizing Treatment Process]

In a case of what is called in-line annealing such as the Sendzimir process, the annealed base metal steel sheet (steel strip) is cooled to a temperature equal or close to a galvanizing bath temperature, under a protective atmosphere, and then immersed in a galvanizing bath. When the content of Si in the base metal steel sheet is 0.25% or more, ungalvanized areas becomes likely to occur. Therefore, in a case of a base metal steel sheet having a high content of Si, it is preferable to perform the out-of-line annealing described above.

In a case of performing the out-of-line annealing, it is preferable to perform the Ni pre-plating treatment step on the base metal steel sheet before performing the galvanizing treatment. It suffices to perform the galvanizing treatment under well-known conditions. In the galvanizing treatment, the base metal steel sheet subjected to the Ni pre-plating treatment is heated at a heating rate of, for example, 20° C./sec or more and preferably to 430 to 480° C., under a protective atmosphere. The heated base metal steel sheet is immersed in the galvanizing bath, so that a galvanized layer adheres on a surface of the base metal steel sheet. The base metal steel sheet with the galvanized layer adhered thereto is drawn up from the galvanizing bath.

A galvanized coating weight can be adjusted by adjusting a drawing-up speed of the base metal steel sheet and a flow rate of a wiping gas employing a well-known method. As to controlling the galvanized coating weigh, there is no essential difference between the in-line annealing and the out-of-line annealing.

A concentration of Al in the galvanizing bath is not limited to a particular concentration but preferably 0.05 to 0.25%. A high concentration of Al suppresses alloying, and a low concentration of Al promotes the alloying.

A temperature of the immersion of the steel sheet in the galvanizing bath is preferably 450 to 475° C. A low temperature of the immersion may lead to occurrence of ungalvanized areas. An excessively high temperature of the immersion increases an amount of dross generated.

[Alloying Treatment Process]

The base metal steel sheet with the galvanized layer formed thereon is heated to an alloying treatment temperature, which is 470 to 620° C. After the heating, the base metal steel sheet is retained at the treatment temperature for 10 to 40 seconds for alloying treatment. The heating rate is, for example, 20° C./sec or more.

When the alloying treatment temperature is less than 470° C., the alloying is likely to become insufficient, with the result that the content of Fe in the galvannealed layer is likely to become less than 7%. Meanwhile, when the alloying treatment temperature is more than 620° C., the alloying is likely to progress excessively, which increases a risk of decreasing the adhesiveness of the galvannealed layer. When a time of the retention at the alloying treatment temperature is less than 10 seconds, the alloying is likely to become insufficient. When the time of the retention is more than 40 seconds, the alloying progresses excessively, which increases the risk of decreasing the adhesiveness of the galvannealed layer.

Through the above steps, the galvannealed steel sheet can be produced.

[Other Steps]

In a case where the galvanizing treatment is performed after the Ni pre-plating treatment on a cold-rolled steel sheet subjected to the out-of-line annealing as the base metal steel sheet, a pickling treatment process may be performed before the Ni pre-plating treatment step. In this case, oxide film can be removed, the oxide film being formed on the surface of the base metal steel sheet through the annealing treatment.

After the annealing treatment process and before the galvanizing treatment (in a case where the Ni pre-plating treatment step is performed, after the annealing treatment process and before the Ni pre-plating treatment step), a temper rolling step aimed at shape straightening and eliminating yield point elongation may be performed. In a case where the temper rolling step is performed, a preferable elongation percentage is 0.1 to 2%. When the elongation percentage is 0.1% or more, the shape straightening and the eliminating yield point elongation can be sufficiently provided. When the elongation percentage is 2% or less, an excellent elongation (total elongation) can be maintained in the galvannealed steel sheet.

The above temper rolling step may be performed after the alloying treatment. In this case, the preferable elongation percentage in the temper rolling step is 0.1 to 2%.

EXAMPLES

Molten steels having chemical compositions shown in Table 1 were produced and cast to be produced into slabs.

TABLE 1

| Steel Number | Chemical Composition (Unit is mass %, Balance: Fe and impurities) | | | | | | | | | | | | | | Remarks |
|---|---|---|---|---|---|---|---|---|---|---|---|---|---|---|---|
| | C | Si | Mn | P | S | Al | N | Ti | Nb | B | F1 | F2 | F3 | F4 | |
| A | 0.0025 | 0.51 | 1.72 | 0.044 | 0.004 | 0.031 | 0.0020 | 0.009 | 0.012 | 0.0020 | 3.1 | 0.0020 | 0.0004 | 163 | Inventive Example |
| B | 0.0023 | 0.35 | 1.70 | 0.081 | 0.003 | 0.028 | 0.0019 | 0.011 | 0.007 | 0.0018 | 3.4 | 0.0018 | 0.0003 | 165 | Comparative Example |
| C | 0.0019 | 0.25 | 2.41 | 0.040 | 0.006 | 0.035 | 0.0022 | 0.008 | 0.008 | 0.0015 | 2.0 | 0.0015 | 0.0008 | 165 | Inventive Example |
| D | 0.0021 | 0.01 | 2.19 | 0.085 | 0.005 | 0.043 | 0.0016 | 0.013 | 0.005 | 0.0023 | 2.2 | 0.0023 | −0.0004 | 153 | Comparative Example |
| E | 0.0033 | 0.07 | 2.38 | 0.047 | 0.004 | 0.022 | 0.0015 | 0.012 | 0.025 | 0.0014 | 1.4 | 0.0014 | −0.0016 | 148 | Inventive Example |
| F | 0.0018 | 0.68 | 1.31 | 0.031 | 0.004 | 0.029 | 0.0023 | 0.007 | 0.012 | 0.0008 | 3.5 | 0.0006 | 0.0003 | 155 | Inventive Example |
| G | 0.0026 | 0.33 | 1.68 | 0.063 | 0.005 | 0.042 | 0.0026 | 0.009 | 0.014 | 0.0021 | 2.9 | 0.0021 | 0.0008 | 152 | Comparative Example |
| H | 0.0023 | 0.38 | 1.62 | 0.097 | 0.007 | 0.032 | 0.0023 | 0.025 | 0.014 | 0.0005 | 3.9 | 0.0005 | −0.0038 | 173 | Comparative Example |
| I | 0.0028 | 0.78 | 1.25 | 0.046 | 0.005 | 0.027 | 0.0024 | 0.016 | 0.008 | 0.0005 | 4.3 | 0.0005 | −0.0002 | 171 | Comparative Example |
| J | 0.0019 | 0.55 | 1.51 | 0.045 | 0.007 | 0.031 | 0.0020 | 0.022 | 0.009 | 0.0001 | 3.3 | 0.0001 | −0.0030 | 158 | Comparative Example |
| K | 0.0016 | 0.04 | 1.56 | 0.043 | 0.007 | 0.027 | 0.0028 | 0.022 | 0.007 | 0.0006 | 1.2 | 0.0006 | −0.0024 | 103 | Comparative Example |
| AA | 0.0017 | 0.48 | 1.38 | 0.025 | 0.004 | 0.028 | 0.0031 | 0.011 | 0.026 | 0.0008 | 2.5 | 0.0008 | −0.0017 | 133 | Comparative Example |
| AB | 0.0028 | 0.44 | 1.80 | 0.056 | 0.006 | 0.031 | 0.0038 | 0.015 | 0.014 | 0.0015 | 3.2 | 0.0015 | 0.0005 | 166 | Comparative Example |
| AC | 0.0020 | 0.66 | 1.65 | 0.046 | 0.005 | 0.022 | 0.0026 | 0.009 | 0.017 | 0.0016 | 3.8 | 0.0016 | −0.0002 | 177 | Comparative Example |
| AD | 0.0024 | 0.54 | 1.45 | 0.043 | 0.007 | 0.019 | 0.0035 | 0.008 | 0.012 | 0.0005 | 3.2 | −0.0004 | 0.0019 | 153 | Comparative Example |
| AE | 0.0012 | 0.50 | 1.68 | 0.043 | 0.006 | 0.035 | 0.0025 | 0.015 | 0.029 | 0.0010 | 3.1 | 0.0010 | −0.0041 | 159 | Comparative Example |
| AF | 0.0023 | 0.38 | 1.20 | 0.031 | 0.006 | 0.028 | 0.0028 | 0.009 | 0.008 | 0.0016 | 2.3 | 0.0015 | 0.0014 | 116 | Comparative Example |
| L | 0.0062 | 0.31 | 1.72 | 0.042 | 0.005 | 0.032 | 0.0021 | 0.009 | 0.040 | 0.0018 | 2.3 | 0.0018 | 0.0006 | 140 | Inventive Example |
| M | 0.0043 | 0.29 | 2.01 | 0.041 | 0.004 | 0.028 | 0.0020 | 0.008 | 0.021 | 0.0015 | 2.2 | 0.0015 | 0.0013 | 151 | Inventive Example |
| N | 0.0057 | 0.02 | 1.93 | 0.085 | 0.006 | 0.025 | 0.0023 | 0.011 | 0.035 | 0.0021 | 2.2 | 0.0021 | 0.0004 | 142 | Comparative Example |
| O | 0.0061 | 0.13 | 1.68 | 0.076 | 0.005 | 0.032 | 0.0021 | 0.025 | 0.007 | 0.0026 | 2.4 | 0.0026 | 0.0007 | 137 | Comparative Example |
| P | 0.0065 | 0.32 | 1.52 | 0.098 | 0.007 | 0.035 | 0.0023 | 0.032 | 0.025 | 0.0006 | 3.7 | 0.0006 | −0.0028 | 162 | Comparative Example |

TABLE 1-continued

| Steel Number | Chemical Composition (Unit is mass %, Balance: Fe and impurities) | | | | | | | | | | | | | | |
|---|---|---|---|---|---|---|---|---|---|---|---|---|---|---|---|
| | C | Si | Mn | P | S | Al | N | Ti | Nb | B | F1 | F2 | F3 | F4 | Remarks |
| Q | 0.0042 | 0.78 | 1.04 | 0.062 | 0.005 | 0.029 | 0.0019 | 0.018 | 0.008 | 0.0001 | 4.7 | 0.0001 | 0.0003 | 170 | Comparative Example |
| R | 0.0098 | 0.20 | 1.57 | 0.046 | 0.007 | 0.025 | 0.0025 | 0.031 | 0.018 | 0.0012 | 2.0 | 0.0012 | 0.0019 | 123 | Comparative Example |
| BA | 0.0046 | 0.27 | 1.70 | 0.026 | 0.007 | 0.022 | 0.0024 | 0.010 | 0.015 | 0.0012 | 1.7 | 0.0012 | 0.0022 | 126 | Comparative Example |
| BB | 0.0058 | 0.35 | 1.58 | 0.053 | 0.006 | 0.026 | 0.0031 | 0.018 | 0.028 | 0.0010 | 2.7 | 0.0010 | 0.0003 | 143 | Comparative Example |
| BC | 0.0061 | 0.66 | 1.08 | 0.046 | 0.008 | 0.024 | 0.0020 | 0.015 | 0.024 | 0.0009 | 3.8 | 0.0009 | 0.0010 | 150 | Comparative Example |
| BD | 0.0052 | 0.40 | 1.56 | 0.045 | 0.006 | 0.030 | 0.0037 | 0.006 | 0.033 | 0.0006 | 2.7 | −0.0009 | 0.0026 | 144 | Comparative Example |
| BE | 0.0049 | 0.52 | 1.27 | 0.038 | 0.005 | 0.032 | 0.0032 | 0.025 | 0.040 | 0.0007 | 3.0 | 0.0007 | −0.0038 | 139 | Comparative Example |
| BF | 0.0042 | 0.28 | 1.41 | 0.033 | 0.005 | 0.028 | 0.0024 | 0.011 | 0.023 | 0.0012 | 1.9 | 0.0012 | 0.0005 | 117 | Comparative Example |
| S | 0.0036 | 0.05 | 2.48 | 0.048 | 0.005 | 0.018 | 0.0025 | 0.008 | 0.015 | 0.0009 | 1.4 | 0.0008 | 0.0010 | 151 | Inventive Example |
| T | 0.0057 | 0.02 | 2.45 | 0.046 | 0.006 | 0.030 | 0.0022 | 0.011 | 0.035 | 0.0015 | 1.2 | 0.0015 | 0.0003 | 145 | Inventive Example |
| U | 0.0023 | 0.52 | 1.56 | 0.037 | 0.004 | 0.027 | 0.0024 | 0.010 | 0.009 | 0.0013 | 3.0 | 0.0013 | 0.0007 | 152 | Inventive Example |
| V | 0.0055 | 0.28 | 1.75 | 0.048 | 0.004 | 0.021 | 0.0022 | 0.013 | 0.023 | 0.0016 | 2.3 | 0.0016 | 0.0012 | 141 | Inventive Example |
| W | 0.0046 | 0.38 | 1.70 | 0.033 | 0.005 | 0.028 | 0.0020 | 0.008 | 0.027 | 0.0012 | 2.3 | 0.0012 | 0.0008 | 142 | Inventive Example |

The slabs having steel numbers were produced into hot-rolled steel sheets at finishing temperatures FT (° C.) and coiling temperatures CT (° C.) shown in Table 2. The hot-rolled steel sheets were subjected to the cold rolling at rolling ratio of 80% to be produced into cold-rolled steel sheets. The cold-rolled steel sheets were subjected to the annealing treatment at annealing temperatures (° C.) shown in Table 2 to be produced into base metal steel sheets. Base metal steel sheets having test numbers other than 49 and 50 were subjected to pickling treatment after the annealing, and then subjected to the Ni pre-plating treatment, so that a Ni plated layer having a coating weight of 0.5 g/m² was formed on a surface of each of the base metal steel sheets. The base metal steel sheets subjected to the Ni pre-plating treatment were subjected to the galvanizing treatment (Zn coating weight per side was set at 45 g/m², an Al concentration in a Zn bath was 0.14 to 0.17%, and a bath temperature was 455 to 460° C.). Specifically, the base metal steel sheets were heated to 460° C. at a heating rate of 20° C./sec and then subjected to the galvanizing treatment while immersed in a galvanizing bath.

Base metal steel sheets having the test numbers 49 and 50 were not subjected to the Ni pre-plating treatment but subjected to the galvanizing treatment under the same condition as that described above in galvanizing equipment capable of performing the in-line annealing.

The base metal steel sheets subjected to the galvanizing treatment were subjected to the alloying treatment at alloying treatment temperatures (° C.) for retention times (sec) as shown in Table 2. The steel sheets subjected to the alloying treatment were subjected to temper rolling at an elongation percentage of 1.0% to be produced into galvannealed steel sheets having a plate thickness of 0.7 mm.

TABLE 2

| Test Number | Steel Number | Heat Rolling Condition | | Annealing Temperature (° C.) | Galvanizing Treatment | | Remarks |
|---|---|---|---|---|---|---|---|
| | | FT (° C.) | CT (° C.) | | Alloying Treatment Temperature (° C.) | Retention Time (sec) | |
| 1 | A | 870 | 750 | 830 | 600 | 15 | Inventive Example |
| 2 | B | 850 | 700 | 820 | 590 | 12 | Comparative Example |
| 3 | C | 880 | 720 | 830 | 600 | 14 | Inventive Example |
| 4 | D | 860 | 730 | 810 | 580 | 16 | Comparative Example |
| 5 | E | 840 | 680 | 830 | 550 | 38 | Inventive Example |
| 6 | F | 860 | 680 | 820 | 620 | 17 | Inventive Example |
| 7 | G | 870 | 700 | 810 | 590 | 25 | Comparative Example |

TABLE 2-continued

| | | | | | Galvanizing Treatment | | |
|---|---|---|---|---|---|---|---|
| Test Number | Steel Number | Heat Rolling Condition | | Annealing Temperature (° C.) | Alloying Treatment Temperature (° C.) | Retention Time (sec) | Remarks |
| | | FT (° C.) | CT (° C.) | | | | |
| 8 | A | 920 | 650 | 780 | 600 | 14 | Inventive Example |
| 9 | A | 950 | 620 | 750 | 590 | 16 | Inventive Example |
| 10 | H | 880 | 680 | 800 | 590 | 14 | Comparative Example |
| 11 | I | 880 | 700 | 810 | 580 | 16 | Comparative Example |
| 12 | J | 880 | 750 | 790 | 580 | 16 | Comparative Example |
| 13 | K | 870 | 700 | 790 | 570 | 16 | Comparative Example |
| 14 | AA | 880 | 720 | 830 | 600 | 14 | Comparative Example |
| 15 | AB | 880 | 720 | 830 | 600 | 12 | Comparative Example |
| 16 | AC | 880 | 720 | 830 | 600 | 14 | Comparative Example |
| 17 | AD | 880 | 720 | 830 | 600 | 15 | Comparative Example |
| 18 | AE | 880 | 720 | 830 | 600 | 12 | Comparative Example |
| 19 | AF | 880 | 720 | 830 | 600 | 15 | Comparative Example |
| 20 | A | 960 | 710 | 790 | 610 | 14 | Comparative Example |
| 21 | A | 780 | 520 | 810 | 600 | 16 | Comparative Example |
| 22 | A | 930 | 450 | 780 | 590 | 15 | Comparative Example |
| 23 | A | 870 | 750 | 830 | 640 | 12 | Comparative Example |
| 24 | A | 870 | 750 | 830 | 450 | 30 | Comparative Example |
| 25 | A | 870 | 750 | 830 | 580 | 50 | Comparative Example |
| 26 | A | 870 | 750 | 830 | 480 | 8 | Comparative Example |
| 27 | L | 880 | 750 | 820 | 600 | 14 | Inventive Example |
| 28 | M | 870 | 720 | 840 | 580 | 15 | Inventive Example |
| 29 | N | 900 | 730 | 810 | 610 | 16 | Comparative Example |
| 30 | O | 860 | 720 | 820 | 600 | 21 | Comparative Example |
| 31 | L | 810 | 630 | 770 | 590 | 16 | Inventive Example |
| 32 | L | 840 | 600 | 760 | 600 | 14 | Inventive Example |
| 33 | P | 880 | 710 | 810 | 600 | 16 | Comparative Example |
| 34 | Q | 870 | 730 | 830 | 570 | 12 | Comparative Example |
| 35 | R | 880 | 750 | 800 | 580 | 16 | Comparative Example |
| 36 | BA | 880 | 750 | 820 | 600 | 14 | Comparative Example |
| 37 | BB | 880 | 750 | 820 | 620 | 12 | Comparative Example |
| 38 | BC | 880 | 750 | 820 | 580 | 16 | Comparative Example |
| 39 | BD | 880 | 750 | 820 | 600 | 15 | Comparative Example |
| 40 | BE | 880 | 750 | 820 | 600 | 14 | Comparative Example |
| 41 | BF | 880 | 750 | 820 | 580 | 16 | Comparative Example |
| 42 | L | 970 | 710 | 810 | 600 | 13 | Comparative Example |
| 43 | L | 790 | 520 | 800 | 600 | 15 | Comparative Example |

TABLE 2-continued

| | | Heat Rolling Condition | | Annealing Temperature | Galvanizing Treatment Alloying Treatment Temperature | Retention | |
|---|---|---|---|---|---|---|---|
| Test Number | Steel Number | FT (° C.) | CT (° C.) | (° C.) | (° C.) | Time (sec) | Remarks |
| 44 | L | 940 | 560 | 790 | 600 | 14 | Comparative Example |
| 45 | L | 880 | 750 | 820 | 640 | 12 | Comparative Example |
| 46 | L | 880 | 750 | 820 | 450 | 36 | Comparative Example |
| 47 | L | 880 | 750 | 820 | 580 | 50 | Comparative Example |
| 48 | L | 880 | 750 | 820 | 520 | 8 | Comparative Example |
| 49 | S | 840 | 650 | 830 | 590 | 15 | Inventive Example |
| 50 | T | 880 | 750 | 820 | 580 | 20 | Inventive Example |
| 51 | U | 870 | 730 | 820 | 600 | 15 | Inventive Example |
| 52 | V | 880 | 750 | 810 | 590 | 16 | Inventive Example |
| 53 | W | 860 | 720 | 820 | 580 | 16 | Inventive Example |

[Evaluation Test]

[Test for Evaluating Slab Cracking Resistance]

From the slabs (cast pieces) having the steel numbers, V-notch standard test specimens defined in JIS Z 2242 (2005) were taken. These test specimens were subjected to the Charpy impact test in conformity with JIS Z 2242 (2005), and ductile-brittle transition temperatures vTrs (° C.) were measured. When a ductile-brittle transition temperature vTrs (° C.) of a slab was −20° C. or less, the slab was evaluated to be excellent in the slab cracking resistance.

[Test for Evaluating Mechanical Characteristics]

From the galvannealed steel sheets having the test numbers, tensile test specimens were taken. The taken test specimens were subjected to a tension test in conformity with JIS Z 2241 (2011) in the air at a normal temperature (25° C.), and yield strengths YP (0.2% yield stresses) and tensile strengths TS (MPa) were determined.

[Test for Evaluating Average r Value and in-Plane Anisotropy Δr Value]

From the galvannealed steel sheets having the test numbers, tensile test specimens were taken. The taken test specimens were subjected to determination of plastic strain ratio in conformity with JIS Z 2254 (2008), and $r_L$ values, $r_{45}$ values, and $r_C$ values were determined. Using the resultant $r_L$ values, $r_{45}$ values, and $r_C$ values, average r values were determined based on Formula (A). In addition, using the resultant $r_L$ values, $r_{45}$ values, $r_C$ values, in-plane anisotropy Δr values were determined based on Formula (B). When an average r value of a test specimen is 1.2 or more, and an in-plane anisotropy Δr value of the test specimen is −0.5 to 0.5, the test specimen was evaluated to be excellent in the deep drawability.

[Test for Evaluating Ungalvanized Area]

Whether an ungalvanized area occurred was judged by carrying out a visual check on the surfaces of the galvannealed steel sheets having the test numbers.

[Test for Measuring Fe Content and the Like in Galvannealed Layer]

From the galvannealed steel sheets having the test numbers, samples each including a galvannealed layer were taken. The galvannealed layer was dissolved out using a 10% hydrochloric acid to which an inhibitor (700BK from Asahi Chemical Co., Ltd., 0.3%) is added, and the coating weight of the galvannealed layer was calculated from a difference in weight of the galvannealed steel sheet before and after the dissolution and removal. In addition, from the solution used for the dissolution, amounts of Zn, Fe, Al, and Ni were measured by the inductively coupled plasma atomic emission spectroscopy (ICP-AES) analysis, and a Zn coating weight and a content of Fe in a galvannealed layer (degree of alloying) were calculated. When the content of Fe of a sample is 7 to 15%, it was determined that an excellent galvannealed layer was obtained.

[Test for Evaluating Coating Adhesiveness]

The galvannealed steel sheet having the test numbers were subjected to a 25 mm cup drawing test. After the test, blackness was measured by a tape test. The less blackness of a galvannealed steel sheet is, the more excellent coating adhesiveness of the galvannealed steel sheet is. In the present example, when blackness of a galvannealed steel sheet was less than 30%, the galvannealed steel sheet was determined to be excellent in coating adhesiveness (denoted as "E" (Excellent) in Table 3). When blackness of a galvannealed steel sheet was 30% or more, coating adhesiveness of the galvannealed steel sheet was determined to be low (denoted as "NA" (Not Accepted) in Table 3).

[Test for Evaluating Secondary Working Embrittlement Resistance]

From the galvannealed steel sheets having the test numbers, blanks having a diameter of 45 mm were fabricated. The blanks were subjected to draw forming (at a drawing ratio of 2.2) using a spherical punch having a punch diameter of 20.64 mm. Thereafter, the blanks were immersed in ethanol at −40° C. with their side surfaces being level, and pressed by a press machine to be crashed. On the pressed blanks, presence/absence of a brittle crack was judged by carrying out visual check.

[Evaluation Results]
The results of the evaluation are shown in Table 3.

TABLE 3

| Test Number | Steel Number | Slab Cracking Resistance Vtrs °C. | Mechanical Characteristics YP (MPa) | TS (MPa) | Total Elongation (%) | r value Average r value $r_m$ | Δr value | Galvanizabilities ungalvanized area | Fe content (%) | coating Adhesiveness | Secondary Working Embrittlement Resistance Brittle Crack | Remarks |
|---|---|---|---|---|---|---|---|---|---|---|---|---|
| 1 | A | −20 | 292 | 459 | 37 | 1.73 | −0.26 | Not Occurred | 11.3 | E | Not Occurred | Inventive Example |
| 2 | B | 0 | 295 | 464 | 36 | 1.82 | −0.18 | Not Occurred | 11.6 | E | Not Occurred | Comparative Example |
| 3 | C | −20 | 293 | 463 | 35 | 1.71 | −0.23 | Not Occurred | 10.8 | E | Not Occurred | Inventive Example |
| 4 | D | 10 | 285 | 448 | 36 | 1.76 | 0.13 | Not Occurred | 10.5 | E | Not Occurred | Comparative Example |
| 5 | E | −20 | 283 | 446 | 36 | 1.74 | −0.26 | Not Occurred | 10.9 | E | Not Occurred | Inventive Example |
| 6 | F | −20 | 277 | 452 | 36 | 1.75 | 0.21 | Not Occurred | 11.4 | E | Not Occurred | Inventive Example |
| 7 | G | −10 | 283 | 446 | 37 | 1.73 | −0.29 | Not Occurred | 10.9 | E | Not Occurred | Comparative Example |
| 8 | A | −20 | 305 | 468 | 35 | 1.42 | −0.28 | Not Occurred | 11.2 | E | Not Occurred | Inventive Example |
| 9 | A | −20 | 311 | 475 | 34 | 1.25 | −0.29 | Not Occurred | 11.0 | E | Not Occurred | Inventive Example |
| 10 | H | 80 | 310 | 487 | 31 | 1.71 | −0.28 | Not Occurred | 7.2 | E | Occurred | Comparative Example |
| 11 | I | 20 | 323 | 478 | 31 | 1.68 | −0.3 | Occurred | 8.8 | E | Occurred | Comparative Example |
| 12 | J | 30 | 287 | 452 | 32 | 1.68 | −0.33 | Not Occurred | 9.4 | E | Occurred | Comparative Example |
| 13 | K | −20 | 207 | 322 | 36 | 1.78 | −0.23 | Not Occurred | 9.9 | E | Not Occurred | Comparative Example |
| 14 | AA | −30 | 272 | 403 | 35 | 1.68 | −0.26 | Not Occurred | 11.2 | E | Not Occurred | Comparative Example |
| 15 | AB | 0 | 294 | 463 | 35 | 1.72 | −0.23 | Not Occurred | 10.6 | E | Not Occurred | Comparative Example |
| 16 | AC | −20 | 304 | 478 | 33 | 1.69 | −0.34 | Not Occurred | 10.2 | E | Occurred | Comparative Example |
| 17 | AD | 50 | 285 | 448 | 32 | 1.65 | −0.29 | Not Occurred | 10.5 | E | Occurred | Comparative Example |
| 18 | AE | 60 | 286 | 450 | 36 | 1.73 | −0.25 | Not Occurred | 11.3 | E | Occurred | Comparative Example |
| 19 | AF | −30 | 245 | 386 | 35 | 1.71 | −0.28 | Not Occurred | 10.4 | E | Not Occurred | Comparative Example |
| 20 | A | −20 | 286 | 449 | 32 | 1.12 | −0.53 | Not Occurred | 10.6 | E | Occurred | Comparative Example |
| 21 | A | −20 | 297 | 467 | 30 | 1.18 | −0.65 | Not Occurred | 10.5 | E | Occurred | Comparative Example |
| 22 | A | −20 | 290 | 456 | 31 | 1.15 | −0.61 | Not Occurred | 10.6 | E | Occurred | Comparative Example |
| 23 | A | −20 | 304 | 463 | 35 | 1.58 | −0.24 | Not Occurred | 16.5 | NA | Not Occurred | Comparative Example |
| 24 | A | −20 | 280 | 455 | 37 | 1.84 | −0.28 | Not Occurred | 4.0 | E | Not Occurred | Comparative Example |
| 25 | A | −20 | 302 | 460 | 35 | 1.60 | −0.25 | Not Occurred | 16.8 | NA | Not Occurred | Comparative Example |
| 26 | A | −20 | 281 | 456 | 37 | 1.82 | −0.29 | Not Occurred | 3.6 | E | Not Occurred | Comparative Example |
| 27 | L | −20 | 293 | 466 | 35 | 1.63 | −0.23 | Not Occurred | 10.9 | E | Not Occurred | Inventive Example |
| 28 | M | −20 | 308 | 476 | 34 | 1.72 | −0.21 | Not Occurred | 11.2 | E | Not Occurred | Inventive Example |
| 29 | N | 0 | 291 | 460 | 34 | 1.72 | −0.26 | Not Occurred | 10.3 | E | Not Occurred | Comparative Example |
| 30 | O | 20 | 287 | 447 | 34 | 1.63 | 0.23 | Not Occurred | 10.6 | E | Not Occurred | Comparative Example |
| 31 | L | −20 | 305 | 473 | 33 | 1.35 | −0.26 | Not Occurred | 11.1 | E | Not Occurred | Inventive Example |
| 32 | L | −20 | 313 | 485 | 32 | 1.23 | −0.29 | Not Occurred | 10.8 | E | Not Occurred | Inventive Example |
| 33 | P | 80 | 215 | 498 | 31 | 1.58 | −0.32 | Not Occurred | 8.2 | E | Occurred | Comparative Example |
| 34 | Q | 60 | 319 | 494 | 30 | 1.65 | −0.29 | Occurred | 7.6 | E | Occurred | Comparative Example |

TABLE 3-continued

| Test Number | Steel Number | Slab Cracking Resistance Vtrs ° C. | Mechanical Characteristics | | Total Elongation (%) | r value | | Galvanizabilities | | | Secondary Working Embrittlement Resistance Brittle Crack | Remarks |
|---|---|---|---|---|---|---|---|---|---|---|---|---|
| | | | YP (MPa) | TS (MPa) | | Average r value $r_m$ | Δr value | ungalvanized area | Fe content (%) | coating Adhesiveness | | |
| 35 | R | −10 | 302 | 467 | 33 | 1.14 | −0.38 | Not Occurred | 10.9 | E | Occurred | Comparative Example |
| 36 | BA | −20 | 259 | 407 | 34 | 1.56 | −0.28 | Not Occurred | 11.5 | E | Not Occurred | Comparative Example |
| 37 | BB | −10 | 291 | 458 | 35 | 1.68 | −0.31 | Not Occurred | 11.2 | E | Not Occurred | Comparative Example |
| 38 | BC | −20 | 302 | 476 | 35 | 1.67 | −0.33 | Not Occurred | 10.3 | E | Occurred | Comparative Example |
| 39 | BD | 50 | 293 | 460 | 33 | 1.65 | −0.32 | Not Occurred | 10.9 | E | Occurred | Comparative Example |
| 40 | BE | 60 | 288 | 453 | 36 | 1.72 | −0.26 | Not Occurred | 10.8 | E | Occurred | Comparative Example |
| 41 | BF | −30 | 252 | 396 | 35 | 1.69 | −0.27 | Not Occurred | 9.7 | E | Not Occurred | Comparative Example |
| 42 | L | −20 | 289 | 455 | 29 | 1.18 | −0.61 | Not Occurred | 10.2 | E | Occurred | Comparative Example |
| 43 | L | −20 | 308 | 479 | 26 | 1.13 | −0.68 | Not Occurred | 11.3 | E | Occurred | Comparative Example |
| 44 | L | −20 | 296 | 463 | 28 | 1.15 | −0.63 | Not Occurred | 11.1 | E | Occurred | Comparative Example |
| 45 | L | −20 | 307 | 468 | 34 | 1.39 | −0.21 | Not Occurred | 17.3 | NA | Not Occurred | Comparative Example |
| 46 | L | −20 | 285 | 462 | 36 | 1.76 | −0.24 | Not Occurred | 4.7 | E | Not Occurred | Comparative Example |
| 47 | L | −20 | 290 | 470 | 34 | 1.35 | −0.22 | Not Occurred | 16.6 | NA | Not Occurred | Comparative Example |
| 48 | L | −20 | 308 | 458 | 36 | 1.72 | −0.25 | Not Occurred | 5.2 | E | Not Occurred | Comparative Example |
| 49 | S | −20 | 285 | 445 | 36 | 1.70 | −0.26 | Not Occurred | 10.6 | E | Not Occurred | Inventive Example |
| 50 | T | −20 | 293 | 461 | 35 | 1.61 | −0.26 | Not Occurred | 11.5 | E | Not Occurred | Inventive Example |
| 51 | U | −30 | 290 | 447 | 36 | 1.70 | −0.24 | Not Occurred | 11.5 | E | Not Occurred | Inventive Example |
| 52 | V | −20 | 286 | 449 | 35 | 1.62 | −0.25 | Not Occurred | 11.7 | E | Not Occurred | Inventive Example |
| 53 | W | −30 | 284 | 446 | 35 | 1.65 | −0.24 | Not Occurred | 11.4 | E | Not Occurred | Inventive Example |

Referring to Table 3, in test numbers 1, 3, 5, 6, 8, 9, 27, 28, 31, 32, and 49 to 53, chemical compositions thereof were appropriate, and producing conditions thereof were also appropriate. Therefore, galvannealed steel sheets having these test numbers had tensile strengths TS of 440 MPa or more, average r values $r_m$ of 1.2 or more, and in-plane anisotropies Δr ranging from −0.5 to 0.5. In addition, contents of Fe in galvannealed layers of the galvannealed steel sheets fell within a range of 7 to 15%. That is, the resultant galvannealed steel sheets had a high strength and an excellent deep drawability. Furthermore, in galvannealed steel sheets having these test numbers, ductile-brittle transition temperatures vTrs (° C.) were −20° C. or less, and excellent slab cracking resistances were obtained. Moreover, no brittle crack was confirmed on the galvannealed steel sheets in the test for evaluating the secondary working embrittlement resistance, and excellent secondary working embrittlement resistances were obtained.

In these test numbers, total elongations were 30% or more. In addition, no ungalvanized areas occurred in these test numbers. Furthermore, in the coating adhesiveness test, blackness were less than 30% in all of these test numbers, indicating excellent coating adhesivenesses.

In contrast, in test numbers 2, 4, 7, 29, and 30, contents of P were excessively high. For that reason, ductile-brittle transition temperatures vTrs (° C.) were more than −20° C. in the test for evaluating slab cracking resistance, indicating low slab cracking resistances.

In a test number 10, a content of P was excessively high, F1 did not satisfy Formula (1), and F3 did not satisfy Formula (3). For that reason, ductile-brittle transition temperature vTrs (° C.) was more than −20° C. in the test for evaluating slab cracking resistance, indicating a low slab cracking resistance. Moreover, a brittle crack occurred in the test for evaluating the secondary working embrittlement resistance, indicating a low secondary working embrittlement resistance.

In test number 11, a content of Si was excessively high. In addition, F1 did not satisfy Formula (1). For that reason, an ungalvanized area occurred. Furthermore, a ductile-brittle transition temperature vTrs (° C.) was more than −20° C. in the test for evaluating slab cracking resistance, indicating a low slab cracking resistance. Moreover, a brittle crack occurred in the test for evaluating the secondary working embrittlement resistance, indicating a low secondary working embrittlement resistance.

In a test number 12, a content of B was excessively low. For that reason, a ductile-brittle transition temperature vTrs (° C.) was more than −20° C. in the test for evaluating slab cracking resistance, indicating a low slab cracking resistance. Moreover, a brittle crack occurred in the test for evaluating the secondary working embrittlement resistance, indicating a low secondary working embrittlement resistance.

In a test number 13, F4 did not satisfy Formula (4). For that reason, a tensile strength TS was less than 440 MPa.

In test numbers 14 and 36, contents of P were excessively low. For that reason, tensile strengths TS were less than 440 MPa.

In test numbers 15 and 37, contents of P were excessively high. For that reason, ductile-brittle transition temperatures vTrs (° C.) were more than −20° C. in the test for evaluating slab cracking resistance, indicating low slab cracking resistances.

In test numbers 16 and 38, F1 did not satisfy Formula (1). For that reason, brittle cracks occurred in the test for evaluating the secondary working embrittlement resistance, indicating low secondary working embrittlement resistances.

In test numbers 17 and 39, F2 did not satisfy Formula (2). For that reason, ductile-brittle transition temperatures vTrs (° C.) were more than −20° C. in the test for evaluating slab cracking resistance, indicating low slab cracking resistances. Moreover, brittle cracks occurred in the test for evaluating the secondary working embrittlement resistance, indicating low secondary working embrittlement resistances.

In test numbers 18 and 40, F3 did not satisfy Formula (3). For that reason, ductile-brittle transition temperatures vTrs (° C.) were more than −20° C. in the test for evaluating slab cracking resistance, indicating low slab cracking resistances. Moreover, brittle cracks occurred in the test for evaluating the secondary working embrittlement resistance, indicating low secondary working embrittlement resistances.

In test numbers 19 and 41, F4 did not satisfy Formula (4). For that reason, tensile strengths TS were less than 440 MPa.

In test numbers 20 and 42, finishing temperatures FT were excessively high. For that reason, average r values $r_m$ were less than 1.2, and in-plane anisotropies Δr were less than −0.5, indicating low deep drawabilities. Moreover, brittle cracks occurred in the test for evaluating the secondary working embrittlement resistance, indicating low secondary working embrittlement resistances.

In test numbers 21 and 43, finishing temperatures FT were excessively low, and as a result, coiling temperatures CT were also excessively low. For that reason, average r values $r_m$ were less than 1.2, and in-plane anisotropies Δr were less than −0.5, indicating low deep drawabilities. Moreover, brittle cracks occurred in the test for evaluating the secondary working embrittlement resistance, indicating low secondary working embrittlement resistances.

In test numbers 22 and 44, coiling temperatures CT were excessively low. For that reason, average r values $r_m$ were less than 1.2, and in-plane anisotropies Δr were less than −0.5, indicating low deep drawabilities. Moreover, brittle cracks occurred in the test for evaluating the secondary working embrittlement resistance, indicating low secondary working embrittlement resistances.

In test numbers 23 and 45, alloying treatment temperatures were excessively high. For that reason, contents of Fe in the galvannealed layers were more than 15%. As a result, blackness was 30% or more in the test for evaluating coating adhesiveness, indicating low coating adhesivenesses.

In test numbers 24 and 46, alloying treatment temperatures were excessively low. For that reason, contents of Fe in the galvannealed layers were less than 7%.

In test numbers 25 and 47, retention times at the alloying treatment temperature were excessively long. For that reason, contents of Fe in the galvannealed layers were more than 15%. As a result, blackness was 30% or more in the test for evaluating coating adhesiveness, indicating low coating adhesivenesses.

In test numbers 26 and 48, retention times at the alloying treatment temperature were excessively short. For that reason, contents of Fe in the galvannealed layers were less than 7%.

In a test number 33, a content of P was excessively high. In addition, F1 did not satisfy Formula (1). For that reason, a ductile-brittle transition temperature vTrs (° C.) was more than −20° C. in the test for evaluating slab cracking resistance, indicating a low slab cracking resistance. Moreover, a brittle crack occurred in the test for evaluating the secondary working embrittlement resistance, indicating a low secondary working embrittlement resistance.

In a test number 34, a content of Si and a content of P were excessively high. For that reason, a ductile-brittle transition temperature vTrs (° C.) was more than −20° C. in the test for evaluating slab cracking resistance, indicating a low slab cracking resistance. Furthermore, a brittle crack occurred in the test for evaluating the secondary working embrittlement resistance, indicating a low secondary working embrittlement resistance. Moreover, an ungalvanized area occurred.

In a test number 35, a content of C was excessively high. For that reason, an average r value was excessively low. Moreover, a ductile-brittle transition temperature vTrs (° C.) was more than −20° C., indicating a low slab cracking resistance.

As seen from the above, the embodiment according to the present invention has been described. However, the aforementioned embodiment is merely an example for practicing the present invention. Therefore, the present invention is not limited to the previously-mentioned embodiment, and the previously-mentioned embodiment can be modified and implemented as appropriate without departing from the scope of the present invention.

The invention claimed is:

1. A galvannealed steel sheet comprising:
  a base metal steel sheet having a chemical composition containing, in mass %:
  C: 0.0080% or less;
  Si: 0.7% or less;
  Mn: 1.0 to 2.5%;
  P: more than 0.030 to 0.048%;
  S: 0.025% or less;
  Al: 0.005 to 0.20%;
  N: 0.010% or less;
  Ti: 0.005 to 0.040%;
  Nb: 0.005 to 0.060%; and
  B: 0.0005 to 0.0030%, with the balance being Fe and impurities, the chemical composition satisfying Formula (1) to Formula (4); and
  a galvannealed layer formed on a surface of the base metal steel sheet and containing 7 to 15 mass % of Fe, wherein
  an average r value of the galvannealed steel sheet is 1.2 or more,
  an in-plane anisotropy Δr value of the galvannealed steel sheet is −0.5 to 0.5, and
  a tensile strength of the galvannealed steel sheet is 440 MPa or more:

$$25 \times P + 4 \times Si \leq 3.6 \quad (1)$$

$$B - X1 \geq 0.0005 \quad (2)$$

$$C - (12/93) \times Nb - X2 \geq -0.0035 \quad (3)$$

$$110 \times Si + 48 \times Mn + 550 \times P \geq 120 \quad (4)$$

where for symbols of elements in Formulae, contents (mass %) of corresponding elements are substituted, in addition, X1 in Formula (2) is defined as follows, $$X1=(11/14)[N-(14/48)\times Ti] \text{ when } N-(14/48)\times Ti>0,$$
and $$X1=0 \text{ when } N-(14/48)\times Ti\leq 0$$

in addition, X2 in Formula (3) is defined as follows, $$X2=(12/48)[Ti-(48/14)\times N] \text{ when } Ti-(48/14)\times N>0,$$
and $$X2=0 \text{ when } Ti-(48/14)\times N\leq 0.$$

2. The galvannealed steel sheet according to claim 1, wherein
the chemical composition contains:
C: less than 0.0040%;
Ti: 0.005 to 0.035%; and
Nb: 0.005 to 0.035%.

3. The galvannealed steel sheet according to claim 1, wherein
the chemical composition contains:
C: 0.0040 to 0.0080%;
Ti: 0.005 to 0.040%; and
Nb: 0.005 to 0.060%, and
a lower limit value of Formula (3) is −0.0002.

4. A production method of a galvannealed steel sheet according to claim 1, the method comprising:
a step of producing a hot-rolled steel sheet by performing hot rolling on a slab having a chemical composition at a rolling finishing temperature of 800 to 950° C., and coiling the hot-rolled steel sheet at a coiling temperature of 600 to 760° C.;
a step of producing a cold-rolled steel sheet by performing cold rolling on the hot-rolled steel sheet;
a step of producing a base metal steel sheet by performing annealing treatment on the cold-rolled steel sheet;
a step of performing galvanizing treatment on the base metal steel sheet; and
a step of performing alloying treatment in which the galvanized base metal steel sheet is retained at an alloying treatment temperature of 470 to 620° C. for 10 to 40 seconds,
wherein the chemical composition of the slab contains, in mass %:
C: 0.0080% or less;
Si: 0.7% or less;
Mn: 1.0 to 2.5%;
P: more than 0.030 to 0.048%;
S: 0.025% or less;
Al: 0.005 to 0.20%;
N: 0.010% or less;
Ti: 0.005 to 0.040%;
Nb: 0.005 to 0.060%; and
B: 0.0005 to 0.0030%, with the balance being Fe and impurities, the chemical composition satisfying Formula (1) to Formula (4):

$$25\times P+4\times Si\leq 3.6 \tag{1}$$

$$B-X1\geq 0.0005 \tag{2}$$

$$C-(12/93)\times Nb-X2\geq -0.0035 \tag{3}$$

$$110\times Si+48\times Mn+550\times P\geq 120 \tag{4}$$

where for symbols of elements in Formulae, contents (mass %) of corresponding elements are substituted, in addition, X1 in Formula (2) is defined as follows, $$X1=(11/14)[N-(14/48)\times Ti] \text{ when } N-(14/48)\times Ti>0,$$
and $$X1=0 \text{ when } N-(14/48)\times Ti\leq 0$$

in addition, X2 in Formula (3) is defined as follows, $$X2=(12/48)[Ti-(48/14)\times N] \text{ when } Ti-(48/14)\times N>0,$$
and $$X2=0 \text{ when } Ti-(48/14)\times N\leq 0.$$

5. The production method of a galvannealed steel sheet according to claim 4, further comprising:
a step of, after the step of producing the base metal steel sheet and before the step of performing the galvanizing treatment, performing Ni pre-plating treatment on the base metal steel sheet; and
a step of, after the step of performing the Ni pre-plating treatment and before the step of performing the galvanizing treatment, heating the base metal steel sheet having been subjected to the Ni pre-plating.

6. The production method of a galvannealed steel sheet according to claim 4,
wherein the chemical composition of the slab contains:
C: less than 0.0040%;
Ti: 0.005 to 0.035%; and
Nb: 0.005 to 0.035%.

7. The production method of a galvannealed steel sheet according to claim 6, further comprising:
a step of, after the step of producing the base metal steel sheet and before the step of performing the galvanizing treatment, performing Ni pre-plating treatment on the base metal steel sheet; and
a step of, after the step of performing the Ni pre-plating treatment and before the step of performing the galvanizing treatment, heating the base metal steel sheet having been subjected to the Ni pre-plating.

8. The production method of a galvannealed steel sheet according to claim 4,
wherein the chemical composition of the slab contains:
C: 0.0040 to 0.0080%;
Ti: 0.005 to 0.040%; and
Nb: 0.005 to 0.060%, and
a lower limit value of Formula (3) is −0.0002.

9. The production method of a galvannealed steel sheet according to claim 8, further comprising:
a step of, after the step of producing the base metal steel sheet and before the step of performing the galvanizing treatment, performing Ni pre-plating treatment on the base metal steel sheet; and
a step of, after the step of performing the Ni pre-plating treatment and before the step of performing the galvanizing treatment, heating the base metal steel sheet having been subjected to the Ni pre-plating.

* * * * *